April 3, 1934.        W. S. RICHHART        1,953,773
MEANS FOR COMPENSATING FOR VOLTAGE CHANGES
Filed Dec. 23, 1931

INVENTOR,
William S. Richhart,
By Minturn & Minturn,
Attorneys.

Patented Apr. 3, 1934

1,953,773

UNITED STATES PATENT OFFICE 1,953,773

MEANS FOR COMPENSATING FOR VOLTAGE CHANGES

William S. Richhart, Indianapolis, Ind.

Application December 23, 1931, Serial No. 582,719

6 Claims. (Cl. 171—119)

This invention relates to the art of electrical voltage control between a source of electricity and an applied load by permitting load voltage changes to affect certain inherent characteristics of a circuit without employment of mechanically moving regulators.

The principal object of my invention is to so regulate the voltage delivered by a transformer or a primary line that, as the load is applied, the delivered voltage increases directly with the load voltage drop to maintain a constant load voltage instead of dropping off as has heretofore been the case. I accomplish this object By setting up a back voltage or counter electromotive force to oppose or hold back the impressed voltage in part at no load and then release that restrained voltage as the load is applied.

Other objects of the invention reside in the particular method employed and manner of use of particular elements in the circuit to bring about the compensating effect, as specifically set out in the claims below, and as will become apparent by the following description which is made in reference to the accompanying drawing wherein the invention is diagrammatically illustrated.

Figure 1:
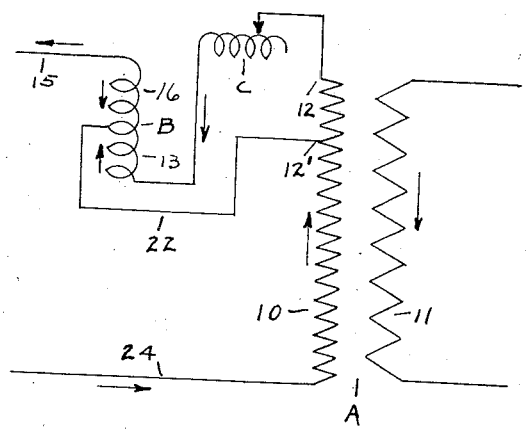
Figure 2:
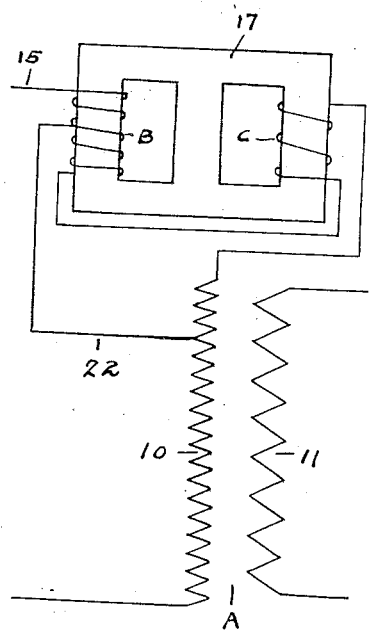
Figure 3:
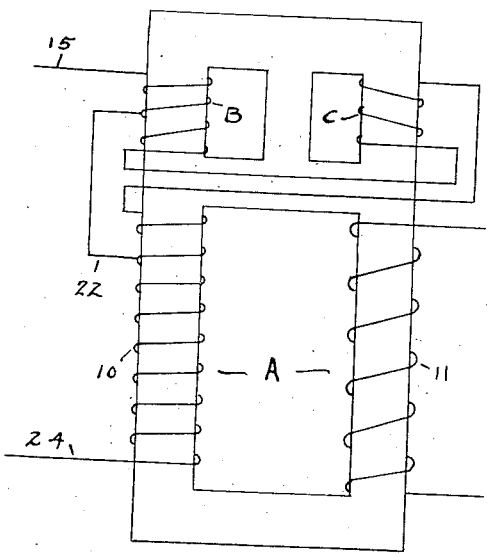

Referring to the drawing, Fig. 1 is a wiring diagram of a circuit embodying my invention;

Fig. 2, a diagram of the same circuit in a form adapted to be applied to a previously built transformer;

Fig. 3, a diagram of the circuit built in a transformer; and

Figure 4:
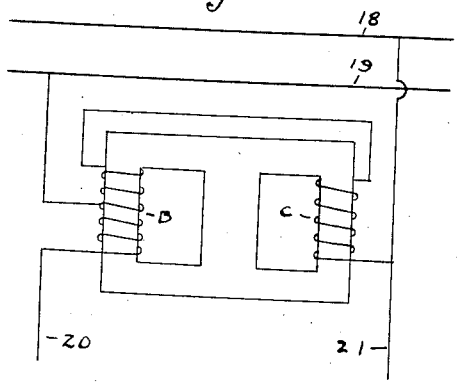

Fig. 4, a diagram of the circuit as applied to the bus bars or feeder lines as usually employed in a substation.

Like characters of reference indicate like parts in the several views in the drawing.

The transformer to which the invention is applied in one form is generally designated by the letter A and has the usual primary winding 10 and secondary winding 11. The primary winding is also formed in the usual manner with various taps to which one of the primary leads may be selectively connected to obtain the desired output voltage from the secondary winding 11.

I place an auxiliary transformer B in series with a reactance, here shown as an induction coil C between a primary lead 15 and a tap 12 on the primary winding of the transformer A which tap would ordinarily be that one to give the normal voltage in the secondary winding 11. The transformer B is essentially an inductive winding tapped off in the center to give a primary end 13 and a secondary end 16. From the center tap of this transformer B, I carry a conductor 22 to a tap 12' on the transformer A primary winding removed somewhat from the first named tap in the direction along the winding, which tap 12' would normally be connected to for an increased voltage output in the secondary. The distance between the taps 12 and 12' is that length of primary winding 10 which would be required to induce sufficient additional voltage in the secondary to make up for the drop in the secondary under load conditions, and therefore this distance between connected taps can be predetermined in accordance with the maximum drop to be expected in the secondary. In reference to the above used term "tap", the usual transformer now employed has several connections or taps externally of the primary winding to which the primary line may be connected to give the desired secondary voltage. For instance, where line loss is small, and voltage fluctuations are small, more of the primary winding is employed, but where there are larger losses to be made up, the transformer is stepped up by shifting primary connections along the winding to give a greater output in the secondary.

Referring to Fig. 1 principally, assuming a no load condition, alternating current flowing in the primary leads 24 and 15 will pass through the winding 10 of the transformer A through the reactance C, and the primary winding 13 of the auxiliary transformer B, which flow will induce a counter electromotive force in the secondary winding 16 of the transformer B in direct opposition to the voltage being impressed on the transformer. The situation then is that, while the transformer A is tapped up through the conductor 22 to otherwise give an increased voltage in the secondary winding 11, the counter voltage set up in the secondary winding 16 of the auxiliary transformer B is sufficient to offset that tapped up voltage by opposing the flow of current by that amount from the conductor 22 across the winding 16 to the lead 15, and the resultant effective voltage in the primary winding 10 is the same as though the lead 15 had been directly connected to the tap 12.

Now assuming a load to be applied to the secondary winding 11 of the main transformer A, a drop in voltage in accordance with the load applied would ordinarily result and correspondingly appear in the winding 10. However, with a voltage drop in the primary winding 13, less counter voltage is induced in the secondary winding 16, and, therefore more current can flow from the conductor 22 through the winding 16 to the lead 15, and the effect of this additional current flow is to produce more ampere turns which would tend to demagnetize the primary winding 13, which action in turn would permit more current to flow therethrough, but as the load builds on the transformer A the amount of current that can flow through the primary winding 13 of the auxiliary transformer B is limited by the reactance coil C which is so adjusted than when full load current on the transformer A is reached, the ampere turns in the primary winding 13 are equal to the ampere turns in the secondary winding 16. Under this full load condition, the ampere turns in the auxiliary transformer would then be zero and no back voltage would exist in the secondary winding 16, thus allowing the primary current to flow into that part of the transformer A primary winding 10 between the lead 24 and the tap 12' with only a small resistance drop in the auxiliary transformer. In this manner, the voltage then impressed on the primary winding 10 of the main transformer A has been increased by the amount of the back voltage originally set up in the secondary winding 16 of the auxiliary transformer B. The amount of voltage drop compensated for can be any value selected depending upon the construction of the auxiliary transformer B and the reactance C.

If the transformer A were compensating to give a ten per cent rise above normal voltage at full load, the back voltage in the secondary winding of the auxiliary transformer B would be ten per cent of the normal voltage. With normal voltage impressed on the primary winding of the main transformer A, the secondary voltage delivered by the main transformer would be normal since the main transformer is tapped up ten per cent and a back voltage of ten per cent is being overcome in the auxiliary transformer secondary winding. Of course, the amount of voltage drop compensated for can be of different values selected and depends upon the number of turns in the windings of the transformer B and on the reactance value of the coil C or other reactance means as may be employed. The physical design of the transformer B and reactance C is within the skill of the ordinary electrical engineer versed in the art, and the design can be so arranged that the point of highest voltage compensation is at the point of full load on the main transformer A or it can be arranged to be at some other fixed load condition above the full rated load on the transformer. For example, the transformer could be compensated to give increasing voltage for an increasing load until the transformer carries one and one-half its normal load.

Referring to Fig. 2 of the drawing, the auxiliary transformer B and reactance coil C are shown as wound on an iron core 17 as a unit which may be mounted in the usual transformer tank (not shown) which contains the transformer A. Such a unit may be applied to the heretofore standard transformer where there is sufficient head room in the tank. By applying this unit, the heretofore transformer with its usual characteristic of voltage reduction with load increase may be changed over to a compensating type, wherein a constant load voltage is automatically maintained within predetermined limits. The diagram constituting Fig. 3 in the drawing shows an arrangement whereby the compensating or regulating coils of the transformer B and coil C may be built in as a part of the transformer construction employing a common iron core. Fig. 4 shows a diagram of my invention as applied to a feeder line leading off from the bus bars in a substation. Here the bus bars 20 and 21 supply current to the feeder wires 18 and 19 with the auxiliary transformer B and reactance coil C interposed between the bars and the wires as in the case with the transformer to the end that normally a predetermined part of the available voltage on the bars is suppressed or held back from the feeder wires and then released to the wires upon increase in load on those wires.

The regulation of voltage obtained by use of my invention is instantaneous with load fluctuation. With the present type of motor driven regulators operating with a contact-making volt meter, there is a time delay for the contacts to close and the motor to start up and then operate the regulating apparatus. This motor driven type of regulator requiring that time interval delay can not iron out voltage fluctuations in the line due to change in load, but only returns the line to normal voltage after the fluctuation occurs and not simultaneously as it occurs as does my invention. Furthermore, my invention is very inexpensive as compared to that motor-driven type of regulator. Since I accomplish regulation by induced counter electromotive force, the losses in regulation are small and not unfavorable to the efficiency now obtained in transformers.

In any electrical circuit in the absence of voltage regulating means, the voltage drop in the line increases as the load increases, and, in addition, there is a drop through the heretofore transformer itself. With a transformer equipped with my compensating device as above described, the transformer can be set to deliver sufficient rise in voltage as the load comes on the transformer to compensate for both the secondary line and transformer voltage drops. This invention makes possible an enormous saving in line erection costs since wire sizes smaller than heretofore employed to prevent further line loss under the load voltage drop may be used. The invention also has the advantage of maintaining a constant voltage at the point of use which fact again permits the recovery of a large revenue heretofore lost on account of the voltage drop. On a transformer supplying a transmission line, the voltage could be varied to suit the changing characteristics of that particular line. If a sudden load was thrown on the line, compensation from that transformer would be instantaneous since the apparatus regulating the voltage delivered by the transformer is a part of the transformer circuit. This is of great importance in the present day system of electrical transmission where several lines with differing characteristics are tied together.

My device can also be formed to be controlled manually to vary the voltage delivered by the transformer A. The manual control may be had by varying the connection of the outer tap of the primary winding 10, Fig. 1, to along the coil C so as to obtain varying reactances thereby, as indicated. It would be desirable to incorporate this adjustable reactance in the circuit when built so that adjustment could be made to the transformer for the drop encountered in the particular circuit in which the transformer may be placed. Such means would make unnecessary the employment of expensive equipment for changing the transformer tap connections under load conditions when the load voltage drop exceeds the amount for a predetermined tap connection. Furthermore, under manual control, by reversing the current supplied to the reactance coil C, and auxiliary transformer B, the auxiliary transformer B may be employed to add voltage to the voltage supplied to the main transformer A.

I claim:

1. In combination with a primary winding of a main transformer, voltage change compensating means comprising an auxiliary transformer having its secondary winding in series with a part of said primary winding and the primary winding of the auxiliary transformer being connected across the remaining part of said main transformer primary winding whereby a primary current may be passed through said secondary winding into said main transformer primary winding to have flow of that current subjected to counter electromotive force as may be induced by the auxiliary transformer primary winding in its secondary winding.

2. In combination with a primary winding of a main transformer, voltage change compensating means comprising an auxiliary transformer having its secondary winding in series with a part of said primary winding and the primary winding of the auxiliary transformer being connected across the remaining part of said main transformer primary winding whereby a primary current may be passed through said secondary winding into said main transformer primary winding to have flow of that current subjected to counter electromotive force as may be induced by the auxiliary transformer primary winding in its secondary winding, and a reactance in the auxiliary transformer primary circuit limiting the flow of current therethrough.

3. In combination with a primary winding of a main transformer, voltage change compensating means comprising an auxiliary transformer having its secondary winding in series with a part of said primary winding and the primary winding of the auxiliary transformer being connected across the remaining part of said main transformer primary winding whereby a primary current may be passed through said secondary winding ito said main transformer primary winding to have flow of that current subjected to counter electromotive force as may be induced by the auxiliary transformer primary winding in its secondary winding, and a reactance in the auxiliary transformer primary circuit limiting the flow of current therethrough, said reactance being so adjusted in relation to said auxiliary and main transformers that when a predetermined increase in current on the main transformer is reached, the ampere turns in the primary equal the ampere turns in the secondary of the auxiliary transformer.

4. In combination with a pair of primary leads, load voltage drop compensating means comprising a secondary winding of an auxiliary transformer in series with one of said leads, the primary winding of said auxiliary transformer being connected across between said leads to induce a counter voltage in said secondary winding in amount equal to a predetermined load voltage drop, and a reactance adjusted in amount to limit the flow of current through said primary winding.

5. For an alternating current circuit, a load voltage drop compensating circuit subjected to load voltage fluctuations including an auxiliary transformer having primary and secondary windings, both of said windings being associated in said compensating circuit to have the primary winding adapted to induce a counter electromotive force in the secondary winding opposite to that in the primary winding and impressed on the first circuit, and a reactance in the compensating circuit limiting flow of current through the primary winding and of a sufficient value to cause the ampere turns of each of said windings to be equal under full load conditions.

6. In a system for compensating for voltage drop due to an applied load in a circuit, means for impressing a substantially constant primary voltage on the circuit, means employing the impressed voltage to set up a counter E. M. F. of a magnitude sufficient to equal the anticipated maximum load voltage drop whereby a part of that impressed voltage is held back to give a resultant normal voltage in the load circuit, and means for neutralizing the counter E. M. F. by the voltage drop to release the held back voltage to maintain said normal voltage, and means for setting up a reactance to limit the variation of said counter E. M. F.

WILLIAM S. RICHHART.